(12) United States Patent
Kihara et al.

(10) Patent No.: US 8,415,931 B2
(45) Date of Patent: Apr. 9, 2013

(54) POWER SUPPLY DEVICE

(75) Inventors: Nobuhiro Kihara, Chiyoda-ku (JP); Masayoshi Maeda, Himeji (JP); Naoki Itoi, Chiyoda-ku (JP); Hiroshi Okuda, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 268 days.

(21) Appl. No.: 13/005,968

(22) Filed: Jan. 13, 2011

(65) Prior Publication Data
US 2011/0285361 A1  Nov. 24, 2011

(30) Foreign Application Priority Data

May 21, 2010  (JP) ................................. 2010-117274

(51) Int. Cl.
H02P 9/00 (2006.01)
H02K 11/00 (2006.01)
(52) U.S. Cl. .......................................... 322/99; 322/44
(58) Field of Classification Search .................. 322/99, 322/44, 24, 28; 361/18; 363/108
See application file for complete search history.

(56) References Cited

U.S. PATENT DOCUMENTS

| 6,114,775 A * | 9/2000 | Chung et al. | 307/10.1 |
| 2005/0146308 A1 * | 7/2005 | Quazi et al. | 322/28 |
| 2010/0289459 A1 * | 11/2010 | Kihara et al. | 322/7 |
| 2011/0101930 A1 * | 5/2011 | Itoi et al. | 322/28 |
| 2011/0285361 A1 * | 11/2011 | Kihara et al. | 322/28 |

FOREIGN PATENT DOCUMENTS

| JP | 02-007834 A | 1/1990 |
| JP | 2858008 B2 | 2/1999 |
| JP | 2001-016799 A | 1/2001 |
| JP | 2001-286074 A | 10/2001 |
| JP | 3592187 B2 | 11/2004 |
| JP | 4097361 B2 | 6/2008 |

* cited by examiner

Primary Examiner — Julio Cesar Gonzalez
(74) Attorney, Agent, or Firm — Sughrue Mion, PLLC

(57) ABSTRACT

A power supply device includes: a rectifier having a full-wave rectification circuit whose low side elements are made of MOSFETs; an electrical load supplied with DC power from the rectifier; and a control circuit having a load voltage detector and an AC voltage detector for detecting an input terminal voltage from a permanent-magnet generator; wherein when a terminal voltage across the electrical load is lower than a predetermined value, the control circuit operates the rectifier in full-wave rectification mode, whereas when the terminal voltage across the electrical load is higher than the predetermined value, the control circuit short-circuits input terminals of the permanent-magnet generator with each other, and when power for driving the control circuit is not secured, the control circuit retains the full-wave rectification mode even if the terminal voltage across the electrical load is higher than the predetermined value.

9 Claims, 8 Drawing Sheets

POWER SUPPLY DEVICE

BACKGROUND OF THE INVENTION

1. Field of the Invention

The present invention relates to a power supply device that uses a permanent-magnet generator, including a control unit therefor.

2. Description of the Related Art

As an example of a conventional power supply device using a permanent-magnet generator, there is known a device that includes a permanent-magnet generator, a full-wave rectification circuit made up of diodes, and a generation-voltage control circuit made up of thyristors connected in parallel with low side diodes of the full-wave rectification circuit in such away that the anode of each thyristor is connected to an input terminal of the permanent-magnet generator and the cathode thereof to ground.

In such a generation-voltage control circuit as described above, when power needs to be supplied to an electrical load, if the electrical load includes an electric storage unit and a terminal voltage across the load is low, the thyristors are gate-turned off and AC power generated by the permanent-magnet generator is converted into DC power by the rectification circuit and supplied to the electrical load. Meanwhile, when the electrical load does not need power in such cases as the load includes an electric storage unit and its terminal voltage is high enough, the thyristors are gate-turned on and output terminals of the permanent-magnet generator are short-circuited with each other so as to control the generation voltage.

In the above-described conventional power supply device using a permanent-magnet generator, power losses arise due to voltage drop across the diodes of the full-wave rectification circuit during electricity generation, and that across the thyristors of the generation-voltage control circuit and the low side diodes of the full-wave rectification circuit during the short-circuit, which has in turn caused such problems as generation efficiency of the power supply device decreasing and its radiator increasing in size due to an increase in heat generation.

Therefore, in order to solve such problems with the conventional device described above, another power supply device has been conventionally devised as disclosed in, for example, Japanese Patent No. 2858008, hereinafter referred to as Patent Document 1. The device shown in Patent Document 1 includes MOSFETs, for low side elements of the full-wave rectification circuit, that produce less power losses than the diodes and thyristors. The device operates in full-wave rectification mode in which when an output terminal voltage from the permanent-magnet generator is positive, the MOSFETs are turned off, whereas when the output terminal voltage negative, the MOSFETs are turned on, thereby supplying power to the electrical load. Meanwhile, when the terminal voltage across the electrical load is higher than a predetermined value, the MOSFETs are turned on so that input terminals of the permanent-magnet generator are short-circuited with each other, thereby reducing power losses due to voltage drop across the diodes and thyristors.

However, in the conventional device shown in Patent Document 1, since control power for controlling the power supply device is supplied from the electrical load side (electric storage unit side), in cases such as when connection between the power supply device and the electrical load is interrupted, the control circuit for the MOSFETs is not supplied with enough power, so that the MOSFETs cannot be properly driven, causing a problem in that the permanent-magnet generator becomes unloaded, impressing an overvoltage on the power supply device.

SUMMARY OF THE INVENTION

The present invention has been made to solve the problems described above, which aims at obtaining a power supply device including a control circuit that supplies power for driving a MOSFET control circuit from the permanent-magnet generator side and secures power enough for driving the MOSFET control circuit, thereby enabling the control circuit to drive MOSFETs properly at all times, so that operation stability of the power supply device can be enhanced.

A power supply device according to an aspect of the present invention comprises: a permanent-magnet generator including a rotor having a magnet for forming a magnetic field and a stator having a stator winding; a rectifier including a full-wave rectification circuit, for rectifying an AC current generated by the permanent-magnet generator into a DC current, whose low side elements are made of MOSFETs; an electrical load supplied with DC power output from the rectifier; and a control circuit including a load voltage detector for detecting a terminal voltage across the electrical load and an AC voltage detector for detecting an input terminal voltage from the permanent-magnet generator; wherein when the terminal voltage across the electrical load is lower than a predetermined value, if the input terminal voltage from the permanent-magnet generator connected to each MOSFET is positive, the control circuit turns off the each MOSFET, whereas if the input terminal voltage negative, the control circuit turns on the each MOSFET, thereby supplying power to the electrical load (full-wave rectification mode); meanwhile, when the terminal voltage across the electrical load is higher than the predetermined value, the control circuit turns on the MOSFETs, thereby short-circuiting input terminals of the permanent-magnet generator with each other, furthermore, the control circuit includes a power supply unit supplied with power for driving the control circuit from the permanent-magnet generator, and when the power for driving the control circuit is not secured, the power supply unit retains the full-wave rectification mode even if the terminal voltage across the electrical load is higher than the predetermined value.

A power supply device according to another aspect of the present invention comprises: a permanent-magnet generator including a rotor having a magnet for forming a magnetic field and a stator having a stator winding; a rectifier including a full-wave rectification circuit, for rectifying an AC current generated by the permanent-magnet generator into a DC current, whose low side elements are made of MOSFETs; an electrical load supplied with DC power output from the rectifier; and a control circuit including a load voltage detector for detecting a terminal voltage across the electrical load and an AC voltage detector for detecting an input terminal voltage from the permanent-magnet generator; wherein when the terminal voltage across the electrical load is lower than a first predetermined value, if the input terminal voltage from the permanent-magnet generator connected to each MOSFET is positive, the control circuit turns off the each MOSFET, whereas if the input terminal voltage negative, the control circuit turns on the each MOSFET, thereby supplying power to the electrical load, furthermore, the control circuit includes a power supply unit supplied with power for driving the control circuit from the permanent-magnet generator, and when the terminal voltage across the electrical load is higher than the first predetermined value and the input terminal voltage from the permanent-magnet generator connected to each MOSFET is lower than the first predetermined value but higher than a voltage set to a second predetermined value that allows power enough for driving the control circuit to be secured, the power supply unit turns on the MOSFETs.

Since a power supply device according to the present invention includes the control circuit that supplies power for driving the MOSFET control circuit from the permanent-magnet generator side, power enough for driving the MOSFET control circuit can be secured at all times; therefore, a power supply device can be obtained in which the MOSFETs can be driven properly at all times, so that its operation stability can be enhanced.

The foregoing and other object, features, aspects and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
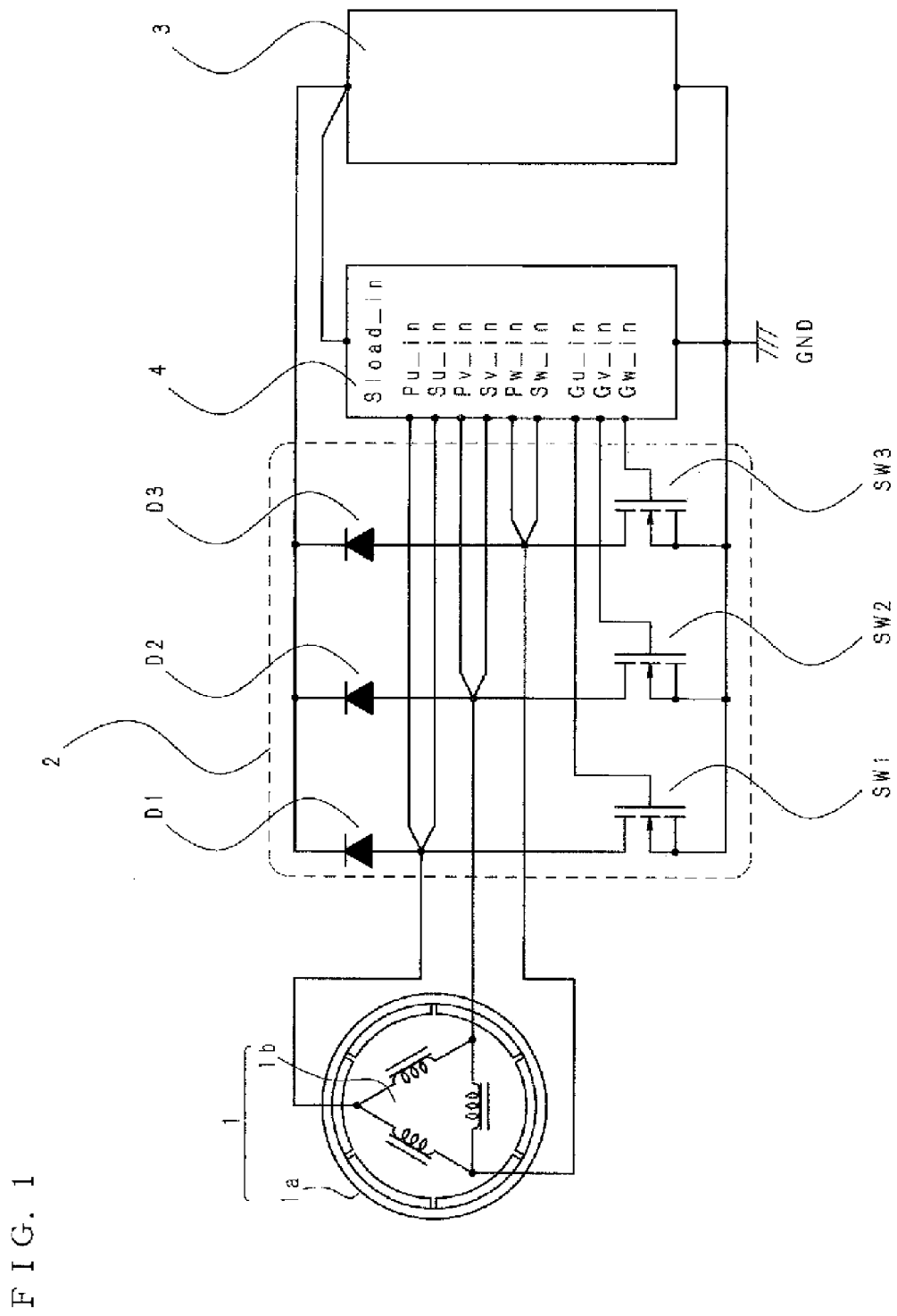
FIG. 1 is a configurational view showing the entirety of a power supply device according to Embodiment 1 of the present invention.

FIG. 1 is a configurational view showing the entirety of a power supply device according to Embodiment 1 of the present invention. In FIG. 1, the power supply device according to Embodiment 1 includes a permanent-magnet generator 1, a rectifier 2 including a full-wave rectification circuit that rectifies an AC current generated by the permanent-magnet generator 1 into a DC current, an electrical load 3 (an electric storage unit such as a battery) supplied with power output from the rectifier 2, and a control circuit 4.

The permanent-magnet generator 1 includes a rotor 1a having a magnet that forms a magnetic field and a stator 1b having a stator winding; the rotor 1a is connected to a rotational power source, such as a rotation shaft (not shown in the figure) directly connected to a crank shaft of an internal combustion engine or connected to the crank shaft via a belt or a gear. The rotor 1a rotates in accordance with rotation of the rotation shaft, whereby an AC voltage is generated by the stator 1b.

In the rectifier 2, the high side elements of the full-wave rectification circuit are made of diodes D1, D2 and D3, and the low side elements thereof, MOSFETs SW1, SW2 and SW3 whose gate signals are supplied from the control circuit 4.

The control circuit 4 includes a load voltage detector Sload_in that detects a terminal voltage across the electrical load 3, AC voltage detectors Su_in, Sv_in and Sw_in that detect input terminal voltages from the permanent-magnet generator 1, power supply units Pu_in, Pv_in, Pw_in that supply power for driving the control circuit from the permanent-magnet generator 1, and gate signal supply units Gu_in, Gv_in and Gw_in that drive the MOSFETs SW1, SW2 and SW3 of the rectifier 2.

When the terminal voltage across the electrical load is lower than a predetermined value, if an input terminal voltage from the permanent-magnet generator 1 connected to each of the MOSFETs SW1, SW2 and SW3 is positive, the each MOSFET is turned off, whereas the input terminal voltage negative, the each MOSFET is turned on, thereby supplying power to the electrical load 3 (full-wave rectification mode).

Meanwhile, when the terminal voltage across the electrical load 3 is higher than the predetermined value and the power for driving the control circuit is secured, all the MOSFETs SW1, SW2 and SW3 are turned on, thereby short-circuiting the input terminals of the permanent-magnet generator 1 with each other, so that the terminal voltage across the electrical load 3 can be controlled.

Figure 2:
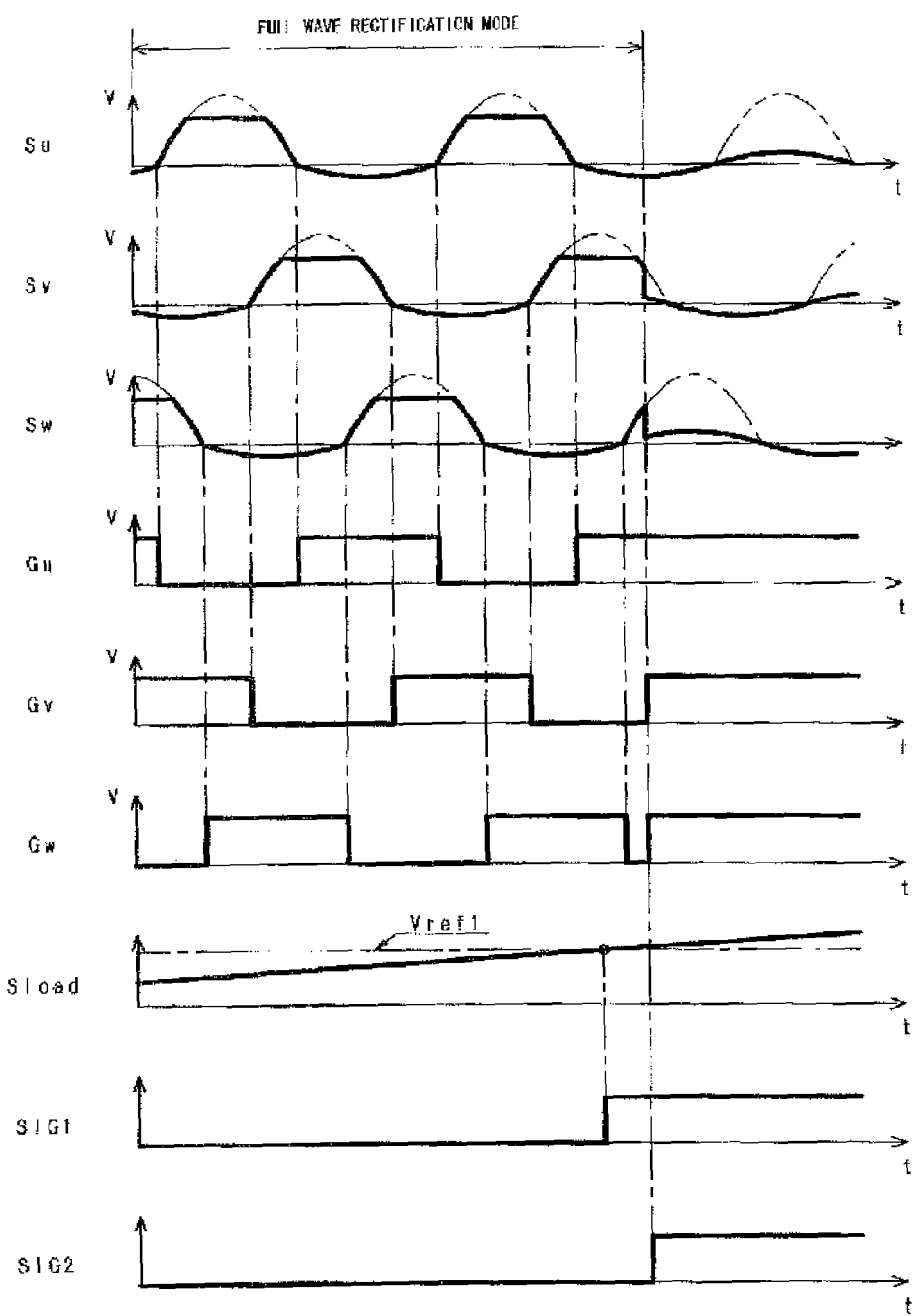
FIG. 2 is a view of operating waveforms of the power supply device according to Embodiment 1 of the invention.

FIG. 2 shows operating waveforms of the power supply device according to Embodiment 1 of the present invention. Su, Sv and Sw denote input terminal voltages from the permanent-magnet generator 1; Gu, Gv and Gw, gate signals applied to the MOSFETs SW1, SW2 and SW3 of the rectifier 2; Sload, the terminal voltage across the electrical load 3; Vref1, a predetermined value for the terminal voltage across the electrical load 3; SIG1, a determination signal as to whether or not the terminal voltage across the electrical load 3 is higher than the predetermined value; and SIG2, a determination signal as to whether or not the power for driving the control circuit is secured.

When Sload is lower than the predetermined value Vref1, SIG1 becomes LOW, and Gu becomes LOW during a period of Su being positive, so that SW1 is turned off, whereby a current flows via D1 from the generator side to the electrical load side during a period of Su being higher than the terminal voltage across the electrical load 3, whereas during a period of Su being negative, Gu becomes HIGH, so that SW1 is turned on, whereby a current flows via SW1 from the ground side to the generator side. Similarly, during a period of Sv being positive, Gv becomes LOW, so that SW2 is turned off, whereby a current flows via D2 from the generator side to the electrical load side during a period of Sv being higher than the terminal voltage across the electrical load 3, whereas during a period of Sv being negative, Gv becomes HIGH, so that SW2 is turned on, whereby a current flows via SW2 from the ground side to the generator side. Moreover, during a period of Sw being positive, Gw becomes LOW, so that SW3 is turned off, whereby a current flows via D3 from the generator side to the electrical load side during a period of Sw being higher than the terminal voltage across the electrical load 3, whereas during a period of Sw being negative, Gw becomes HIGH, so that SW3 is turned on, whereby a current flows via SW3 from the ground side to the generator side (full-wave rectification mode).

When Sload is higher than Vref1, SIG1 becomes HIGH; however, when SIG2 is LOW, the full-wave rectification mode is continued.

When both SIG1 and SIG2 are HIGH, Gu, Gv and Gw become HIGH, so that all the MOSFETs SW1, SW2 and SW3 are turned on, whereby the AC input terminals of the permanent-magnet generator are electrically short-circuited with each other, thereby regulating the terminal voltage across the electrical load.

According to Embodiment 1 of the present invention as described above, when the power for driving the control circuit is not secured, the full-wave rectification mode is continued; therefore, the power for driving the control circuit 4 can be supplied from the permanent-magnet generator, whereby power enough for driving a MOSFET control circuit can be secured at all times, so that the MOSFETs can be properly driven at all times, that is, the power supply device can be operated properly at all times.

Embodiment 2

Figure 3:
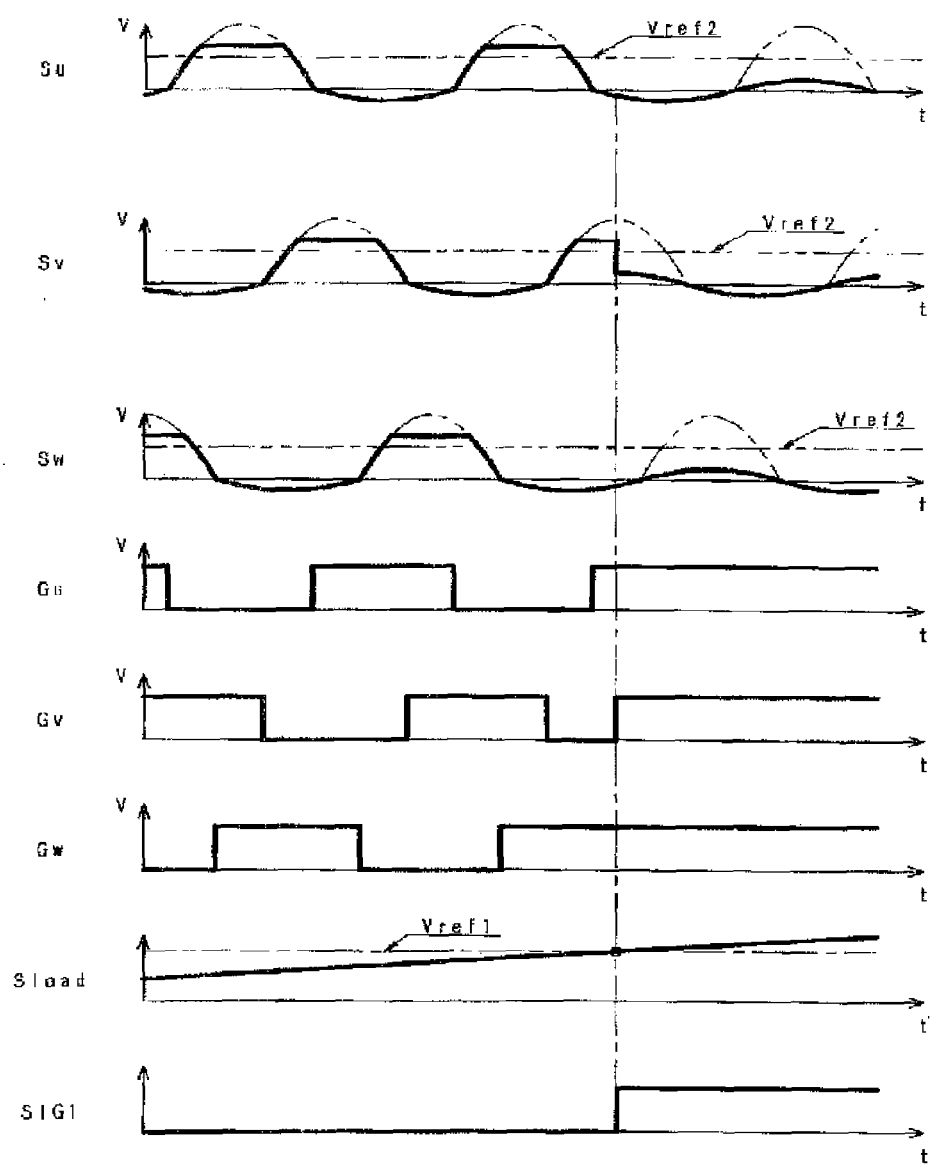
FIG. 3 is a view of operating waveforms of a power supply device according to Embodiment 2 of the invention.

FIG. 3 is a view showing operating waveforms of a power supply device according to Embodiment 2 of the present invention. In Embodiment 2, the configurational view of the entire power supply device is the same as that shown in FIG. 1. In FIG. 3, Su, Sv and Sw denote input terminal voltages from the permanent-magnet generator 1; Gu, Gv and Gw, gate signals applied to the MOSFETs SW1, SW2 and SW3 of the rectifier 2, respectively; Sload, a terminal voltage across the electrical load 3; Vref1, a predetermined value for the terminal voltage across the electrical load 3; SIG1, a determination signal as to whether or not the terminal voltage across the electrical load 3 is higher than the predetermined value; and Vref2, a predetermined value for input terminal voltages from the permanent-magnet generator 1, which is set to a voltage that is lower than the predetermined value Vref1 for the terminal voltage across the electrical load 3 and allows power enough for driving the control circuit to be secured.

When Sload is lower than Vref1, SIG1 becomes LOW, and Gu also becomes LOW during a period of Su being positive, so that SW1 is turned off, whereby a current flows via D1 from the generator side to the electrical load side during a period of Su being higher than the terminal voltage across the electrical load 3, whereas during a period of Su being negative, Gu becomes HIGH, so that SW1 is turned on, whereby a current flows via SW1 from the ground side to the generator side.

Similarly, during a period of Sv being positive, Gv becomes LOW, so that SW2 is turned off, whereby a current flows via D2 from the generator side to the electrical load side during a period of Sv being higher than the terminal voltage across the electrical load 3, whereas during a period of Sv being negative, Gv becomes HIGH, so that SW2 is turned on, whereby a current flows via SW2 from the ground side to the generator side. Moreover, during a period of Sw being positive, Gw becomes LOW, so that SW3 is turned off, whereby a current flows via D3 from the generator side to the electrical load side during a period of Sw being higher than the terminal voltage across the electrical load 3, whereas during a period of Sw being negative, Gw becomes HIGH, so that SW3 is turned on, whereby a current flows via SW3 from the ground side to the generator side.

When Sload is higher than Vref1, SIG1 becomes HIGH, and when SIG1 is HIGH and Su is higher than Vref2, Gu becomes HIGH, so that SW1 is turned on, whereby a current flows via SW1 from the generator side to the ground side.

Similarly, when SIG1 is HIGH and Sv is higher than Vref2, Gv becomes HIGH, so that SW2 is turned on, whereby a current flows via SW2 from the generator side to the ground side. Moreover, when SIG1 is HIGH and Sw is higher than Vref2, Gw becomes HIGH, so that SW3 is turned on, whereby a current flows via SW3 from the generator side to the ground side.

According to Embodiment 2 of the present invention, since the power supply device is operated, as described above, in such a way that the input terminal voltages rise up to a level that can secure power enough for driving the control circuit and then MOSFETs are turned on in that state, the power supply device can be operated properly.

Embodiment 3

Figure 4:
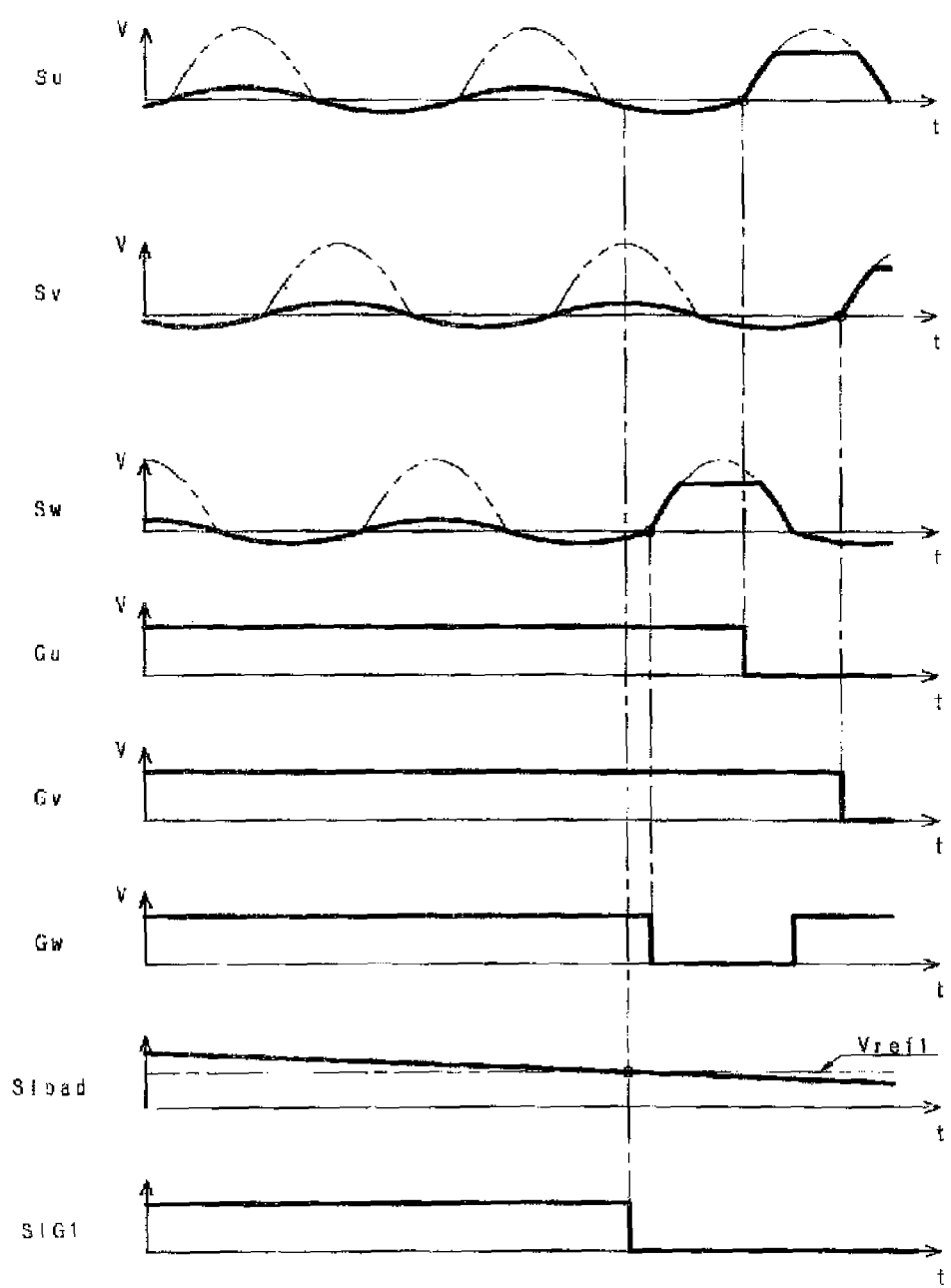
FIG. 4 is a view of operating waveforms of a power supply device according to Embodiment 3 of the invention.

FIG. 4 is a view showing operating waveforms of a power supply device according to Embodiment 3 of the present invention. In Embodiment 3, the configurational view of the entire power supply device is the same as that shown in FIG. 1. In FIG. 4, Su, Sv and Sw denote input terminal voltages from the permanent-magnet generator 1; Gu, Gv and Gw, gate signals applied to the MOSFETs SW1, SW2 and SW3 of the rectifier 2, respectively; Sload, a terminal voltage across the electrical load 3; Vref1, a predetermined value for the terminal voltage across the electrical load 3; and SIG1, a determination signal as to whether or not the terminal voltage across the electrical load 3 is higher than the predetermined value.

When Sload becomes lower than the predetermined value Vref1, SIG1 changes from HIGH to LOW. When Su changes from negative to positive while SIG1 is LOW, Gu is changed from HIGH to LOW, whereby SW1 is turned off.

Similarly, when Sv changes from negative to positive while SIG1 is LOW, Gv is changed from HIGH to LOW, whereby SW2 is turned off, and when Sw changes from negative to positive while SIG1 is LOW, Gw is changed from HIGH to LOW, whereby SW3 is turned off.

According to Embodiment 3 of the present invention, since the MOSFETs SW1, SW2 and SW3 perform switching, as described above, in a state in which a current flowing through the rectifier 2 is zero or minute, power losses during the switching and occurrences of a voltage surge can be brought under control.

Embodiment 4

Figure 5:
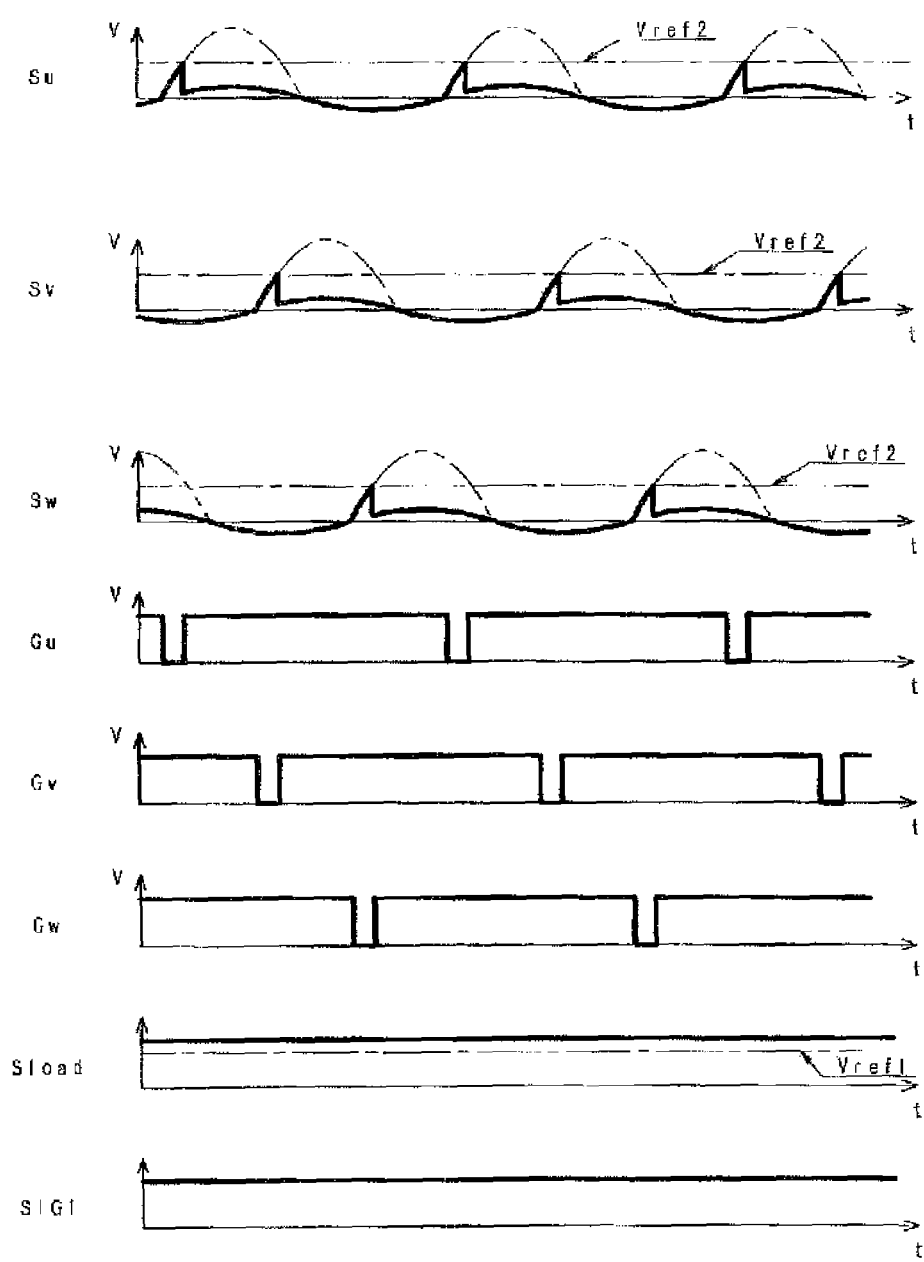
FIG. 5 is a view of operating waveforms of a power supply device according to Embodiment 4 of the invention.

FIG. 5 is a view showing operating waveforms of a power supply device according to Embodiment 4 of the present invention. In Embodiment 4, the configurational view of the entire power supply device is the same as that shown in FIG. 1. In FIG. 5, Su, Sv and Sw denote input terminal voltages from the permanent-magnet generator 1; Gu, Gv and Gw, gate signals applied to the MOSFETs SW1, SW2 and SW3 of the rectifier 2, respectively; Sload, a terminal voltage across the electrical load 3; Vref1, a predetermined value for the terminal voltage across the electrical load 3; SIG1, a determination signal as to whether or not the terminal voltage across the electrical load 3 is higher than the predetermined value; and Vref2, a predetermined value for input terminal voltages from the permanent-magnet generator 1, which is set to a voltage that is lower than the terminal voltage across the electrical load 3 and allows power enough for driving the control circuit to be secured.

When Sload is higher than Vref1, SIG1 becomes HIGH. When Su changes from negative to positive when Gu is HIGH, Gu is changed from HIGH to LOW, whereby SW1 is turned off. By turning off SW1, Su rises up to a voltage that allows power enough for driving the circuit to be secured. When Su exceeds Vref2, Gu becomes HIGH, so that SW1 is turned on, whereby a current flows via SW1 from the generator side to the ground side.

Similarly, when Sv changes from negative to positive when Gv is HIGH, Gv is changed from HIGH to LOW, whereby SW2 is turned off. By turning off SW2, Sv rises up to a voltage that allows power enough for driving the circuit to be secured. Gv becomes HIGH when Sv exceeds Vref2, so that SW2 is turned on, whereby a current flows via SW2 from the generator side to the ground side. Moreover when Sw changes from negative to positive when Gw is HIGH, Gw is changed from HIGH to LOW, whereby SW3 is turned off. By turning off SW3, Sw rises up to a voltage that allows power enough for driving the circuit to be secured. When Sw exceeds Vref2, Gw becomes HIGH, so that SW3 is turned on, whereby a current flows via SW3 from the generator side to the ground side.

According to Embodiment 4 of the present invention, even if Sload stays higher than Vref1 for a considerably long period of time, the power supply device, as described above, is operated for each period in such a way that the input terminal voltages rise up to a level that can secure power enough for driving the control circuit; therefore, the MOSFETs can be driven without power needed for driving the control circuit 2 going short, and as a result, the power supply device can be operated properly at all times. Moreover, since Vref2 is set to a value lower than the terminal voltage across the electrical load 3, power only for driving the control circuit can be secured without being supplied to the electrical load 3.

Embodiment 5

Figure 6:
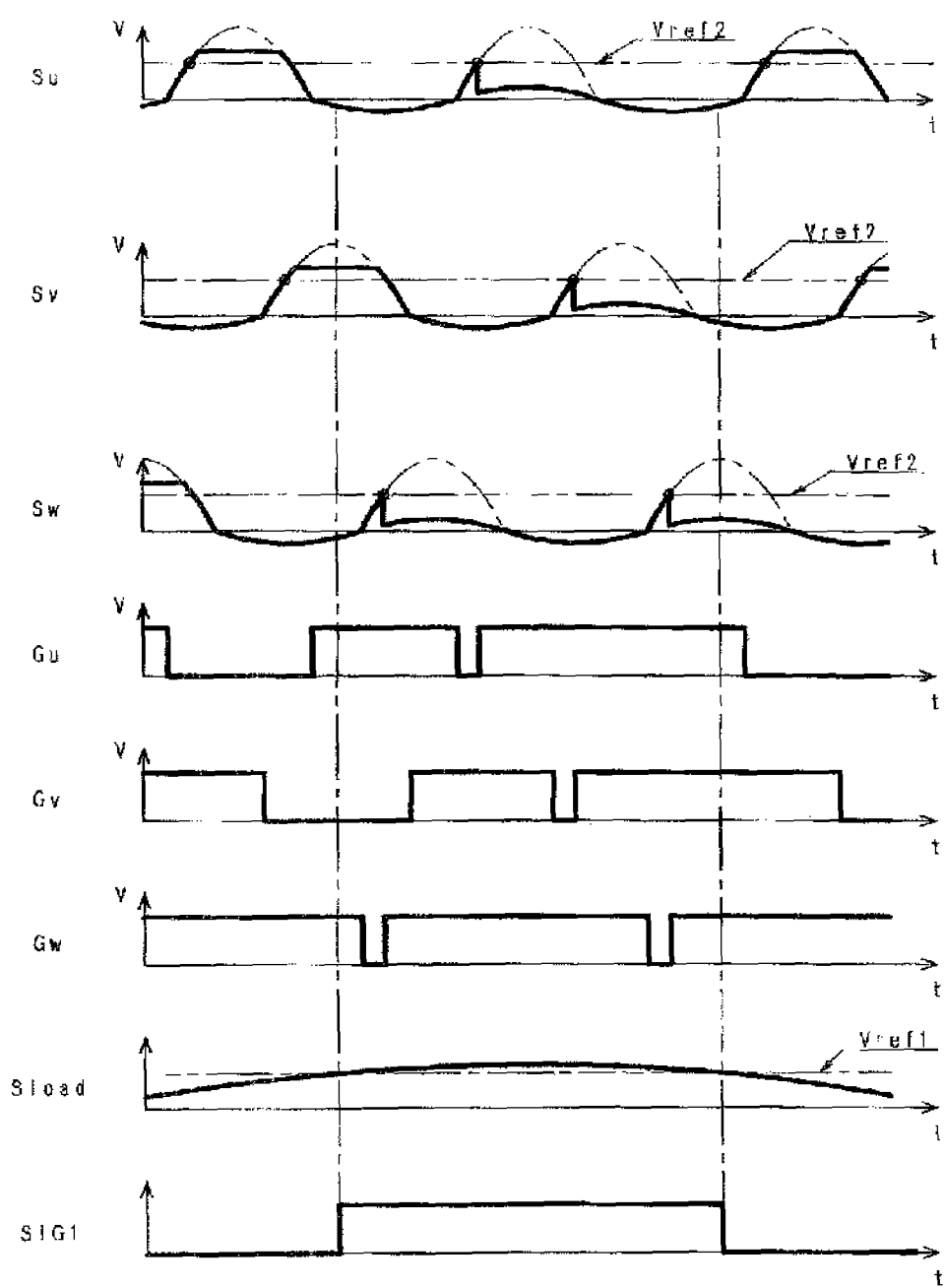
FIG. 6 is a view of operating waveforms of a power supply device according to Embodiment 5 of the invention.

FIG. 6 is a view showing operating waveforms of a power supply device according to Embodiment 5 of the present invention. In Embodiment 5, the configurational view of the entire power supply device is the same as that shown in FIG. 1. In FIG. 6, Su, Sv and Sw denote input terminal voltages from the permanent-magnet generator 1; Gu, Gv and Gw, gate signals applied to the MOSFETs SW1, SW2 and SW3 of the rectifier 2, respectively; Sload, a terminal voltage across the electrical load 3; Vref1, a predetermined value for the terminal voltage across the electrical load 3; SIG1, a determination signal as to whether or not the terminal voltage across the electrical load 3 is higher than the predetermined value; and Vref2, a predetermined value for input terminal voltages from the permanent-magnet generator 1, which is set to a voltage that is lower than the terminal voltage across the electrical load 3 and allows power enough for driving the control circuit to be secured.

Now, when Sload, the terminal voltage across the electrical load 3, is higher than Vref1, SIG1 becomes HIGH, whereas when lower than Vref1, SIG1 becomes LOW.

When Su is lower than Vref2 and SIG1 is LOW, Gu becomes LOW during a period of Su being positive, so that SW1 is turned off, whereby a current flows via D1 from the generator side to the electrical load side during a period of Su being higher than the terminal voltage across the electrical load 3, whereas during a period of Su being negative, Gu becomes HIGH, so that SW1 is turned on, whereby a current flows via SW1 from the ground side to the generator side. Then, when Su changes from negative to positive again, Gu becomes LOW, so that SW1 is turned off, whereby Su rises up to Vref2.

When Su is Vref2 and SIG1 is HIGH, Gu becomes HIGH, so that SW1 is turned on, whereby a current flows via SW1 from the generator side to the ground side during a period of Su being positive, whereas during a period of Su being negative, a current flows via SW1 from the ground side to the generator side. Then, when Su changes from negative to positive again, Gu becomes LOW, so that SW1 is turned off, whereby Su rises up to Vref2.

Similarly, when Sv is lower than Vref2 and SIG1 is LOW, Gv becomes LOW during a period of Sv being positive, so that SW2 is turned off, whereby a current flows via D2 from the generator side to the electrical load side during a period of Sv being higher than the terminal voltage across the electrical load 3, whereas during a period of Sv being negative, Gv becomes HIGH, so that SW2 is turned on, whereby a current flows via SW2 from the ground side to the generator side. Then, when Sv changes from negative to positive again, Gv becomes LOW, so that SW2 is turned off, whereby Sv rises up to Vref2.

When Sv is Vref2 and SIG1 is HIGH, Gv becomes HIGH, so that SW2 is turned on, whereby a current flows via SW2 from the generator side to the ground side during a period of Sv being positive, whereas during a period of Sv being negative, a current flows via SW2 from the ground side to the generator side. Then, when Sv changes from negative to positive again, Gv becomes LOW, so that SW2 is turned off, whereby Sv becomes Vref2.

Moreover, when Sw is Vref2 and SIG1 is LOW, Gw becomes LOW during a period of Sw being positive, so that SW3 is turned off, whereby a current flows via D3 from the generator side to the electrical load side during a period of Sw being higher than the terminal voltage across the electrical load 3, whereas during a period of Sw being negative, Gw becomes HIGH, so that SW3 is turned on, whereby a current flows via SW3 from the ground side to the generator side. Then, when Sw changes from negative to positive again, Gw becomes LOW, so that SW3 is turned off, whereby Sw rises up to Vref2.

When Sw is Vref2 and SIG1 is HIGH, Gw becomes HIGH, so that SW3 is turned on, whereby a current flows via SW3 from the generator side to the ground side during a period of Sw being positive, whereas during a period of Sw being negative, a current flows via SW3 from the ground side to the generator side. Then, when Sw changes from negative to positive again, Gw becomes LOW, so that SW3 is turned off, whereby Sw rises up to Vref2.

According to Embodiment 5 of the present invention, the power supply device, as described above, is operated for each period in such a way that the input terminal voltages rise up to a level that can secure power enough for driving the control circuit, and furthermore, the MOSFETs SW1, SW2 and SW3 perform switching in a state in which a current flowing through the rectifier 2 is zero or minute; therefore, power losses during the switching and occurrences of a voltage surge can be brought under control.

Embodiment 6

Figure 7:
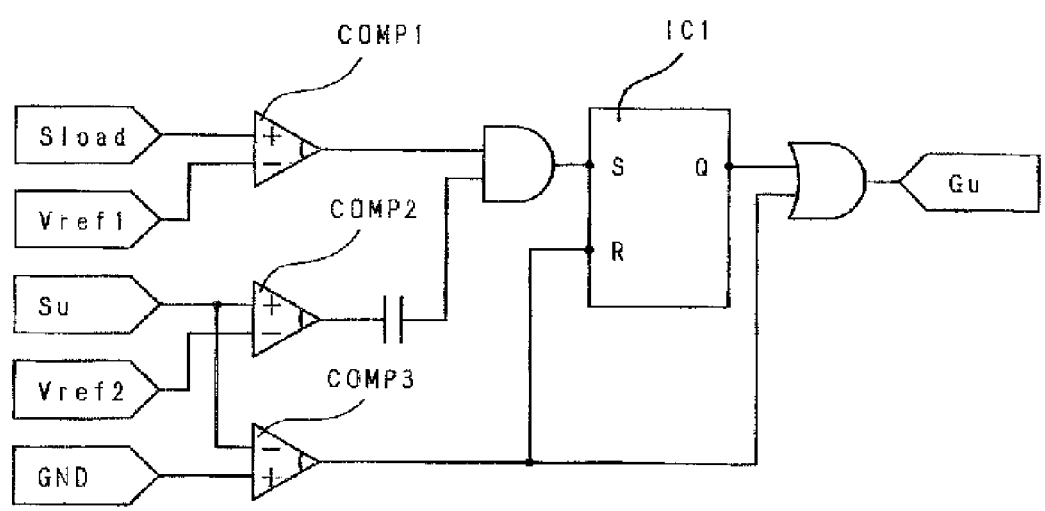
FIG. 7 is a view showing part of the circuit configuration of a control circuit according to Embodiment 6 of the invention.

FIG. 7 is a view showing part of the circuit configuration of a control circuit according to Embodiment 6 of the present invention. In Embodiment 6, the configurational view of the entirety of a power supply device is the same as that shown in FIG. 1. In FIG. 7, to the control circuit are input: Sload, a terminal voltage across the electrical load 3; Vref1, a predetermined value for the terminal voltage across the electrical load 3; Su, an input terminal voltage from the permanent-magnet generator 1; Vref2, a predetermined value for the input terminal voltage from the permanent-magnet generator 1, set to a value that is lower than the terminal voltage across the electrical load 3 and allows power enough for driving the control circuit to be secured; and a ground voltage, and then a gate signal Gu is output to SW1 of the rectifier 2.

Sload and Vref1 are input to a first comparator COMP1. When Sload is higher than Vref1, COMP1 output becomes HIGH. Moreover, Su and Vref2 are input to a second comparator COMP2. When Su is higher than Vref2, COMP2 output becomes HIGH. Furthermore, Su and the ground voltage are input to a third comparator COMP3. When Su is lower than the ground voltage, COMP3 output becomes HIGH.

An output signal from the COMP1 is applied to an input of an AND gate, and an output signal from the COMP2 is applied via a differentiator to the other input of the gate. An output signal from the AND gate is applied to SET input of a flip-flop circuit IC1, and an output signal from the COMP3 is applied to RESET input of the IC1. An output signal from this IC1 is applied to an input of an OR gate, the output signal from the COMP3 is applied to the other input of the gate, and then a signal is output from the OR gate as Gu.

In the configuration described above, when Su exceeds Vref2, and if Sload is higher than Vref1, a HIGH signal is applied to SET input of the IC1, thereby latching Gu HIGH, so that SW1 is turned on, whereby a current flows via SW1 from the generator side to the ground side. Then, when Su becomes lower than the ground voltage, a HIGH signal is applied from the COMP3 to RESET input of the IC1, thereby changing the IC1 output signal to LOW. However, since the COMP3 output is HIGH, Gu is held HIGH, so that a current flows via SW1 from the ground side to the generator side. Then, when Su exceeds the ground voltage, the output signal from the COMP3 becomes LOW, thereby changing Gu to LOW, so that SW1 is turned off, whereby Su rises up to reach Vref2.

When Su exceeds Vref2 again, if Sload is lower than Vref1, a LOW signal is applied to SET input of the IC1, so that Gu is held LOW, whereby a current flows via D1 from the generator side to the electrical load side during a period of Su being higher than the terminal voltage across the electrical load 3. Then, when Su becomes lower than the ground voltage, since the output signal from the COMP3 changes from LOW to HIGH, Gu changes from LOW to HIGH, so that SW1 is turned on, whereby a current flows via SW1 from the ground side to the generator side. Then, when Su exceeds the ground voltage, since the output signal from the COMP3 becomes LOW, Gu becomes LOW, so that SW1 is turned off, whereby Su rises up. When Su exceeds Vref2, whether or not Sload is higher than Vref1 is determined again, and the following operations are repeated. Regarding the V- and W-phase, Su is replaced with Sv and Sw, and Gu with Gv and Gw, respectively, in the circuit configuration, thereby enabling the same operations.

According to Embodiment 6 of the present invention, the power supply device, as described above, is operated for each period in such a way that the input terminal voltages rise up to a level that can secure power enough for driving the control circuit, and furthermore, MOSFETs SW1, SW2 and SW3 perform switching in a state in which a current flowing through the rectifier 2 is zero or minute; therefore, power losses during the switching and occurrences of a voltage surge can be brought under control.

Embodiment 7

Figure 8:
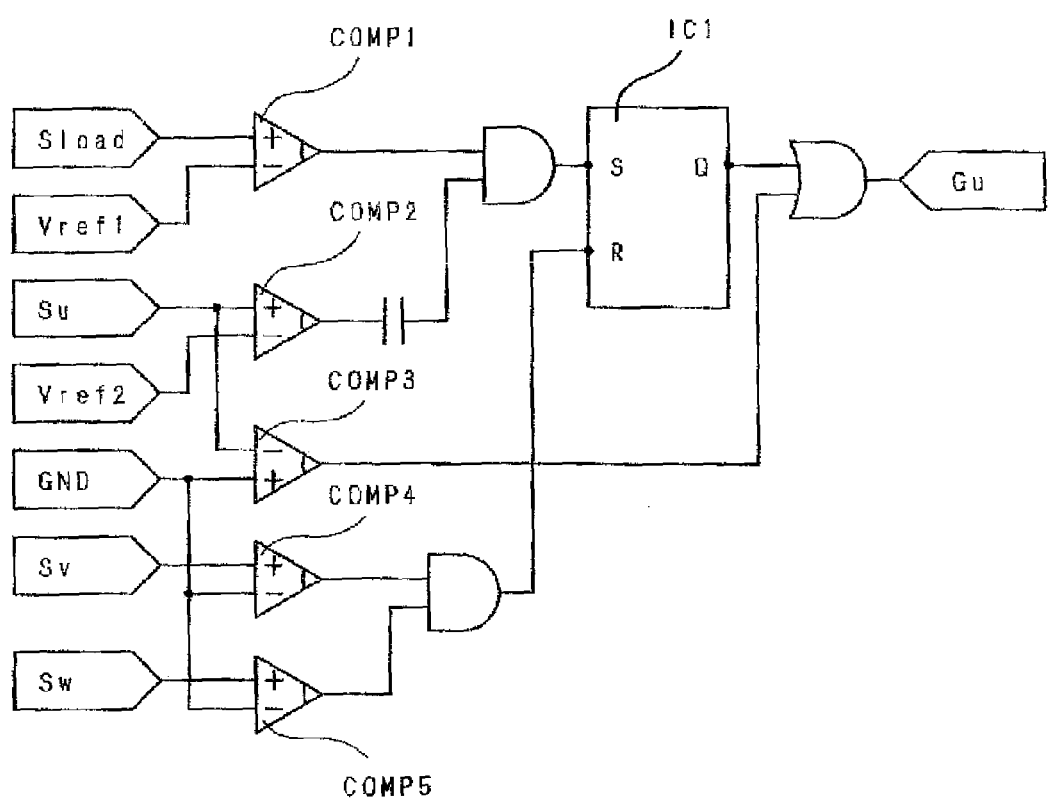
FIG. 8 is a view showing part of the circuit configuration of a control circuit according to Embodiment 7 of the invention.

FIG. 8 is a view showing part of the circuit configuration of a control circuit according to Embodiment 7 of the present invention. In Embodiment 7, the configurational view of the entirety of a power supply device is the same as that shown in FIG. 1. In FIG. 8, to the control circuit are input: Sload, a terminal voltage across the electrical load 3; Vref1, a predetermined value for the terminal voltage across the electrical load 3; Su, an input terminal voltage from the permanent-magnet generator 1; Vref2, a predetermined value for the input terminal voltage from the permanent-magnet generator, set to a value that is lower than the terminal voltage across the electrical load 3 and allows enough power for driving the control circuit to be secured; a ground voltage; Sv, another input terminal voltage from the permanent-magnet generator 1; and Sw, still another input terminal voltage from the permanent-magnet generator 1, and then a gate signal Gu is output to SW1 of the rectifier 2.

Sload and Vref1 are input to a first comparator COMP1 that is an electrical load terminal voltage comparator. When Sload is higher than Vref1, COMP1 output becomes HIGH.

Moreover, Su and Vref2 are input to a second comparator COMP2 that is an AC input terminal predetermined voltage comparator. When Su is higher than Vref2, COMP2 output becomes HIGH.

Furthermore, Su and the ground voltage are input to a third comparator COMP3 that is an AC input terminal negative voltage comparator. When Su is lower than the ground voltage, COMP3 output becomes HIGH.

Moreover, Sv and the ground voltage are input to a comparator COMP4 that is an other-phase input terminal positive voltage comparator A. When Sv is higher than the ground voltage, COMP4 output becomes HIGH. Sw and the ground voltage are input to another comparator COMP5 that is an other-phase input terminal positive voltage comparator B. When Sw is higher than the ground voltage, COMP5 output becomes HIGH.

An output signal from the COMP1 is applied to an input of an AND gate, and an output signal from the COMP2 is applied via a differentiator to the other input of the gate. An output signal from the AND gate is applied to SET input of a flip-flop circuit IC1. An output signal from the COMP4 is applied to an input of another AND gate and an output signal from the COMP5 is applied to the other input of the gate. An output signal from the AND gate is applied to RESET input of the flip-flop circuit IC1. An output signal from this flip-flop circuit is applied to an input of an OR gate, an output signal from the COMP3 is applied to the other input of the gate, and then a signal is output from the OR gate as Gu.

In the configuration described above, when Su exceeds Vref2, if Sload is higher than Vref1, a HIGH signal is applied to SET input of the IC1, thereby latching Gu HIGH, so that SW1 is turned on, whereby a current flows via SW1 from the generator side to the ground side. Then, when Su becomes lower than the grand voltage, a current flows via SW1 from the ground side to the generator side. A HIGH signal is applied to RESET input of the flip-flop circuit IC1 during Sv and Sw being higher than the ground voltage, so that an output signal from the IC1 changes to LOW; however, since the COMP3 output signal is HIGH, Gu is held HIGH, so that a current flows via SW1 from the ground side to the generator side. Then, when Su exceeds the ground voltage, since the COMP3 output signal becomes LOW, Gu becomes LOW, so that SW1 is turned off, whereby Su rises up to reach Vref2.

When Su exceeds Vref2 again, if Sload is lower than Vref1, since a LOW signal is applied to SET input of the flip-flop circuit IC1, Gu is held LOW, so that a current flows via D1 from the generator side to the electrical load side during a period of Su being higher than the terminal voltage across the electrical load 3. Then, when Su becomes lower than the ground voltage, since the output signal from the COMP3 changes from LOW to HIGH, Gu changes from LOW to HIGH, so that SW1 is turned on, whereby a current flows via SW1 from the ground side to the generator side. Then, when Su exceeds the ground voltage, since the output signal from the COMP3 becomes LOW, Gu becomes LOW, so that SW1 is turned off, whereby Su rises up. Then, when Su exceeds Vref2, whether or not Sload is higher than Vref1 is determined again, and the following operations are repeated. Regarding the V- and W-phase, Su is replaced with Sv and Sw and Gu with Gv and Gw, respectively, in the circuit configuration, thereby enabling the same operations.

According to Embodiment 7 of the present invention, the power supply device, as described above, is operated for each period in such a way that the input terminal voltages rise up to a level that can secure power enough for driving the control circuit, and furthermore, MOSFETs SW1, SW2 and SW3 perform switching in a state in which a current flowing through the rectifier 2 is zero or minute; therefore, power losses during the switching and occurrences of a voltage surge can be brought under control.

Moreover, since the reset signal to the flip-flop circuit IC1 is obtained from the other phases, the reset signal can be applied to the IC1 exactly at a time when the input terminal voltages from the permanent-magnet generator become negative, a current flowing through the rectifier when SW1, SW2 and SW3 perform switching can be further decreased.

Various modifications and alterations of this invention will be apparent to those skilled in the art without departing from the scope and spirit of this invention, and it should be understood that this is not limited to the illustrative embodiments set forth herein.

What is claimed is:

1. A power supply device, comprising:
   a permanent-magnet generator including a rotor having a magnet for forming a magnetic field and a stator having a stator winding;
   a rectifier including a full-wave rectification circuit, for rectifying an AC current generated by the permanent-magnet generator into a DC current, whose low side elements are made of MOSFETs;
   an electrical load supplied with DC power output from the rectifier; and
   a control circuit including a load voltage detector for detecting a terminal voltage across the electrical load and an AC voltage detector for detecting an input terminal voltage from the permanent-magnet generator; wherein
   when the terminal voltage across the electrical load is lower than a predetermined value, if the input terminal voltage from the permanent-magnet generator connected to each MOSFET is positive, the control circuit turns off the each MOSFET, whereas if the input terminal voltage negative, the control circuit turns on the each MOSFET, thereby supplying power to the electrical load (full-wave rectification mode); meanwhile, when the terminal voltage across the electrical load is higher than the predetermined value, the control circuit turns on the MOSFETs, thereby short-circuiting input terminals of the permanent-magnet generator with each other, furthermore, the control circuit includes a power supply unit supplied with power from the permanent-magnet generator for driving the control circuit, and when the power for driving the control circuit is not secured, the power supply unit retains the full-wave rectification mode even if the terminal voltage across the electrical load is higher than the predetermined value.

2. A power supply device according to claim 1, wherein when each MOSFET is turned on, the each MOSFET retains an ON state, and is turned off at a time when the input terminal voltage from the permanent-magnet generator connected to the each MOSFET changes from negative to positive.

3. A power supply device according to claim 1, wherein when each MOSFET is turned on, the each MOSFET retains an ON state, and is turned off at every time when the input terminal voltage from the permanent-magnet generator connected to the each MOSFET changes from negative to positive.

4. A power supply device, comprising:
   a permanent-magnet generator including a rotor having a magnet for forming a magnetic field and a stator having a stator winding;
   a rectifier including a full-wave rectification circuit, for rectifying an AC current generated in the permanent-magnet generator into a DC current, whose low side elements are made of MOSFETs;
   an electrical load supplied with DC power output from the rectifier; and
   a control circuit including a load voltage detector for detecting a terminal voltage across the electrical load and an AC voltage detector for detecting an input terminal voltage from the permanent-magnet generator; wherein
   when the terminal voltage across the electrical load is lower than a first predetermined value, if the input terminal voltage from the permanent-magnet generator connected to each MOSFET is positive, the control circuit turns off the each MOSFET, whereas if the input terminal voltage negative, the control circuit turns on the each MOSFET, thereby supplying power to the electrical load, furthermore, the control circuit includes a power supply unit supplied with power from the permanent-magnet generator for driving the control circuit, and when the terminal voltage across the electrical load is higher than the first predetermined value and the input terminal voltage from the permanent-magnet generator connected to each MOSFET is lower than the first predetermined value but higher than a voltage set to a second predetermined value that allows power enough for driving the control circuit to be secured, the power supply unit turns on the each MOSFET.

5. A power supply device according to claim 4, wherein when each MOSFET is turned on, the each MOSFET retains an ON state, and is turned off at a time when the input terminal voltage from the permanent-magnet generator connected to the each MOSFET changes from negative to positive.

6. A power supply device according to claim 4, wherein when each MOSFET is turned on, the each MOSFET retains an ON state, and is turned off at every time when the input terminal voltage from the permanent-magnet generator connected to the each MOSFET changes from negative to positive.

7. A power supply device according to claim 4, wherein when the input terminal voltage from the permanent-magnet generator connected to each MOSFET is the second predetermined value and the terminal voltage across the electrical load is higher than the first predetermined value, the each MOSFET is turned on, retains an ON state, and is turned off at every time when the input terminal voltage from the permanent-magnet generator connected to the each MOSFET changes from negative to positive.

8. A power supply device according to claim 4, further comprising:
   an electrical load terminal voltage comparator for determining whether or not the terminal voltage across the electrical load is higher than the first predetermined value (a first comparator);
   an AC input terminal predetermined voltage comparator for determining whether or not the input terminal voltage from the permanent-magnet generator is higher than the second predetermined value (a second comparator); and an AC input terminal negative voltage comparator for determining whether or not the input terminal voltage from the permanent-magnet generator is negative (a third comparator); wherein A flip-flop circuit is provided, a determination signal from the first comparator is applied to an input of an AND gate and a determination signal from the second comparator is applied via a differentiator to the other input of the AND gate, an output signal from the AND gate is applied to SET input of the flip-flop circuit and a determination signal from the third comparator is applied to RESET input of the flip-flop circuit, an output signal from the flip-flop circuit is applied to an input of an OR gate and the determination signal from the third comparator is applied to the other input of the OR gate, and an output signal from the OR gate is made a control signal for each MOSFET.

9. A power supply device according to claim 4, the permanent-magnet generator being a three-phase AC generator, the power supply device further comprising:

an electrical load terminal voltage comparator for determining whether or not the terminal voltage across the electrical load is higher than the first predetermined value (a first comparator);

an AC input terminal predetermined voltage comparator for determining whether or not an input terminal voltage at one of phases from the permanent-magnet generator is higher than the second predetermined value (a second comparator);

an AC input terminal negative voltage comparator for determining whether or not the input terminal voltage from the permanent-magnet generator is negative (a third comparator); and an other-phase input terminal positive voltage comparator A and an other-phase input terminal positive voltage comparator B both for determining whether or not input voltages at the other two phases from the three-phase AC generator are positive; wherein a flip-flop circuit is provided, a determination signal from the first comparator is applied to an input of an first AND gate and a determination signal from the second comparator is applied via a differentiator to the other input of the first AND gate, an output signal from the first AND gate is applied to SET input of the flip-flop circuit, a determination signal from the other-phase input terminal positive voltage comparator A is applied to an input of a second AND gate and a determination signal from the other-phase input terminal positive voltage comparator B is applied to the other input of the second AND gate, an output signal from the second AND gate is applied to RESET input of the flip-flop circuit, an output signal from the flip-flop circuit is applied to an input of an OR gate and an determination signal from the third comparator is applied to the other input of the OR gate, and an output signal from the OR gate is made a control signal for each MOSFET.

* * * * *